United States Patent
Aitken

(12) 
(10) Patent No.: US 6,432,851 B1
(45) Date of Patent: Aug. 13, 2002

(54) DURABLE SB-STABILIZED MO+W PHOSPHATE GLASSES

(75) Inventor: Bruce G. Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/583,600

(22) Filed: May 31, 2000

(51) Int. Cl.⁷ .............................. C03C 8/04; C03C 8/08; C03C 3/21
(52) U.S. Cl. .............................. 501/15; 501/24; 501/26; 501/46; 501/47; 501/48; 501/49; 501/52
(58) Field of Search .............................. 501/46, 47, 48, 501/49, 52, 15, 24, 26

(56) References Cited

U.S. PATENT DOCUMENTS

| | | |
|---|---|---|
| 3,951,669 A | 4/1976 | Malmendier et al. |
| 4,314,031 A | 2/1982 | Sanford et al. ................ 501/44 |
| 4,996,172 A | 2/1991 | Beall et al. .................... 501/45 |
| 5,021,366 A | 6/1991 | Aitken ........................ 501/45 |
| 5,122,484 A | 6/1992 | Beall et al. .................... 501/46 |
| 5,153,151 A | 10/1992 | Aitken ........................ 501/45 |
| 5,256,604 A | 10/1993 | Aitken ........................ 501/45 |
| 5,286,683 A | 2/1994 | Aitken ........................ 501/45 |
| 5,529,961 A * | 6/1996 | Aitken et al. ................. 501/45 |
| 5,926,599 A | 7/1999 | Bookbinder et al. |

FOREIGN PATENT DOCUMENTS

| | | | |
|---|---|---|---|
| JP | 10-139476 A | * | 5/1998 |
| SU | 409975 A | * | 1/1974 |

* cited by examiner

*Primary Examiner*—David Sample
(74) *Attorney, Agent, or Firm*—Mary Y. Redman

(57) ABSTRACT

A durable low $T_g$ Sb-stabilized Mo+W phosphate based glass composition exhibiting superior resistance to attack by boiling water, humidity and acids resulting from the addition of Sb to Mo+W phosphate based glass compositions. Specifically, the present invention discloses a glass composition comprising in mol % on the oxide basis, of 0–40% $R_2O$ where R includes the alkali metals (Li, Na, K, Rb or Cs) as well as Ag and Tl, 0–20% XO where X includes the alkaline earth metals (Mg, Ca, Sr or Ba) as well as Cu, Zn, Cd and Pb, 15–80% $MoO_3+WO_3$, 0.5–60% $Sb_2O_3$, and 10–40% $P_2O_5$. Additionally, the Sb-stabilized Mo+W phosphate based glass composition can contain a total of 0–5%, in mole percent (mol %) on the oxide basis, of glass forming oxides including, but not limited to, $B_2O_3$, $Al_2O_3$, $SiO_2$, $TeO_2$, $Ga_2O3$, $GeO_2$, transition metal and rare earth metal oxides, or mixtures thereof. The resulting durable Sb-stabilized Mo+W phosphate based glass compositions are particularly useful as refractory adhesives, sealing glass frits, and overcladding material for glass fiber.

8 Claims, No Drawings

DURABLE SB-STABILIZED MO+W PHOSPHATE GLASSES

FIELD OF THE INVENTION

The present invention relates generally to durable Sb-stabilized phosphate based glass compositions, and more particularly, to Sb-stabilized Mo+W phosphate based glass compositions exhibiting a low glass transition temperature ($T_g$), and superior resistance to attack from water, humidity and chemicals.

BACKGROUND OF THE INVENTION

There is currently a great need for glass compositions having a low glass transition temperature ($T_g$), from about 250° C. to about 450° C., good chemical durability such as resistance to attack from acids, and resistance to attack from water and humidity. Because of potentially toxic environmental factors, there is also a need for durable, low Tg glass compositions that can be made lead free without affecting durability properties such as resistance to attack from acids, water, humidity, and the like. Glass compositions that combine good chemical durability with the capability of being formed at low temperatures, i.e. compositions having low $T_g$, are potentially useful for a host of applications such as refractory adhesives, sealing glass frits, and overcladding material for glass fiber.

The search has been continuous to discover new durable glass compositions exhibiting low $T_g$ and enhanced resistance to attack by water, humidity, and chemicals. Thus, the present invention is directed towards a group of new durable Sb-stabilized Mo+W phosphate based glass compositions that have a low $T_g$, and superior resistance to attack by water, humidity. and chemicals, and are suitable for use in a variety of applications, such as refractory adhesives, sealing frits, and overcladding material for glass fiber.

Additionally, the preferred Sb-stabilized Mo+W phosphate based glass compositions are essentially lead free. The expression essentially lead free indicates that no material containing a substantial concentration of lead is intentionally included in the glass.

SUMMARY OF THE INVENTION

In accordance with the present invention it is provided that the addition of about 0.5 to about 60% $Sb_2O_3$ to Mo+W phosphate based glass compositions results in a durable, low $T_g$ glass compositions having unexpectedly improved resistance to attack from water, humidity and acids. The durable, low $T_g$ Sb-stabilized Mo+W phosphate based glass compositions of the instant invention preferably comprise, in mole percent (mol %) on the oxide basis, 0–40% $R_2O$ where R includes the alkali metals (Li, Na, K, Rb or Cs) as well as Ag and Tl, 0–20% XO where X includes the alkaline earth metals (Mg, Ca, Sr or Ba) as well as Cu, Zn, Cd and Pb, 15–80% $MoO_3+WO_3$, 0.5–60% $Sb_2O_3$, and 10–40% $P_2O_5$. Additionally, the Sb-stabilized Mo+W phosphate based glass composition can contain a total of 0–5%, in mole percent (mol %) on the oxide basis, of glass forming oxides including, but not limited to, $B_2O_3$, $Al_2O_3$, $SiO_2$, $TeO_2$, $Ga_2O3$, $GeO_2$, transition metal and rare earth metal oxides or mixtures thereof. In a preferred embodiment, the Sb-stabilized Mo+W phosphate based glass compositions are essentially lead free.

Additional features and advantages of the invention will be set forth in the detailed description that follows, and in part, will be readily apparent or recognized to those skilled in the art by practicing the invention as described herein.

It is to be understood that both the foregoing general discussion and the following detailed description and examples provided herein are merely exemplary of the invention, and are intended to provide an overview or framework for understanding the nature and character of the invention as it is claimed.

DETAILED DESCRIPTION OF THE INVENTION

The durable, low $T_g$ Sb-stabilized Mo+W phosphate based glass compositions of the instant invention comprise, in mole percent (mol %) on the oxide basis, 0–40% $R_2O$ wherein R includes the alkali metals (Li, Na, K, Rb or Cs) as well as Ag and Tl; 0–20% XO wherein X includes the alkaline earth metals (Mg, Ca, Sr or Ba) as well as Cu, Zn, Cd and Pb; 15–80% $MoO_3+WO_3$, preferably about 20–60% $MoO_3$; 0.5–60% $Sb_2O_3$; and 10–40% $P_2O_5$, preferably about 15–30% $P_2O_5$. Additionally, the Sb-stabilized Mo+W phosphate based glass composition can contain a total of 0–5%, in mole percent (mol %) on the oxide basis, of glass forming oxides including, but not limited to, $B_2O_3$, $Al_2O_3$, $SiO_2$, $TeO_2$, $Ga_2O3$, $GeO_2$, transition metal and rare earth metal oxides or mixtures thereof.

I have observed that the presence, in mole percent (mol %) on the oxide basis, of about 0.5% to about 60% $Sb_2O_3$, preferably about 5% to about 40% $Sb_2O_3$, more preferably about 10% to about 40% $Sb_2O_3$, in Sb-stabilized Mo+W phosphate based glass compositions unexpectedly results in a lower Tg, and superior resistance to attack from water, humidity, and chemicals such as acids. The glass compositions encompassed by the present invention preferably exhibit a glass transition temperature ($T_g$) from about 250° to about 450° C.; a percentage total weight loss after exposure to 0.001N HCl for one hour (%Δ (0.001N HCl)) less than or equal to about 0.5%; and a percentage total weight loss after exposure to boiling distilled water for one hour (%Δ ($H_2O$)) less than or equal to about 0.5%.

In a preferred embodiment, the new durable Sb-stabilized Mo+W phosphate based glass compositions of the present invention are essentially Pb free.

The invention will be further clarified by the following Tables that are intended to be exemplary of the invention.

Table I summarize the data of four Mo phosphate based glass compositions, wherein the constituents of each glass composition are expressed in terms of mole percent on the oxide basis. Table I reports the glass transition temperature ($T_g$) in terms of ° C.; the percentage of total weight loss after exposure to 0.001N HCl for one hour (%Δ (0.001N HCl)); and the percentage of total weight loss after exposure to boiling distilled water for one hour (%Δ ($H_2O$)).

In Table I, Comparative Example 1 demonstrates a Mo phosphate based glass composition without the addition of $Sb_2O_3$, and therefore does not fall within the purview of the present invention. Examples 2, 3 and 4 representing the instant invention, demonstrate that the substitution of 10 mol% of $Sb_2O_3$ for either $R_2O$, $MoO_3$ or $P_2O_5$ results in an unexpectedly 60 fold to 400 fold improvement in resistance to boiling water and a comparable increase in acid durability. At the same time, Tg is reduced by about 10° C. and 60° C. in Examples 2 and 4 respectively, compared to Comparative Example 1.

TABLE I

| | Example 1 | 2 | 3 | 4 |
|---|---|---|---|---|
| $Li_2O$ | 7 | 7 | 3.5 | 7 |
| $Na_2O$ | 8 | 8 | 4 | 8 |
| $K_2O$ | 5 | 5 | 2.5 | 5 |
| $MoO_3$ | 60 | 50 | 60 | 60 |
| $Sb_2O_3$ | — | 10 | 10 | 10 |
| $P_2O_5$ | 20 | 20 | 20 | 10 |
| Tg (° C.) | 350 | 338 | — | 290 |
| Wt % Δ($H_2O$) | 28 | 0.07 | 0.11 | 0.44 |
| α (ppm/° C.) | 14.4 | 14.9 | 13.1 | — |
| Wt % Δ (0.001N HCl) | 11 | 0.06 | 0.50 | 0.38 |

Table II summarizes the data for Mo+W phosphate based glass composition Examples 5–15, wherein the constituents of each glass composition are expressed in terms of mole percent on the oxide basis. Table II reports the glass transition temperature (Tg) in terms of ° C.; the thermal expansion coefficient (α) in terms of ppm/° C.; the percentage of total weight loss after exposure to 0.001N HCl for one hour (%Δ (0.001N HCl)); and the percentage of total weight loss after exposure to boiling distilled water for one hour (%Δ ($H_2O$)) for each of the Mo+W phosphate based glass compositions.

TABLE II

| | Example 5 | 6 | 7 | 8 | 9 | 10 | 11 | 12 | 13 | 14 | 15 |
|---|---|---|---|---|---|---|---|---|---|---|---|
| $Li_2O$ | 7 | 7 | 7 | 3.5 | 3.5 | 7 | — | — | 7 | 7 | 7.5 |
| $Na_2O$ | 8 | 8 | 8 | 4 | 4 | 8 | — | — | 8 | 8 | 5 |
| $K_2O$ | 5 | 5 | 5 | 2.5 | 2.5 | 5 | — | — | 5 | 5 | 7.5 |
| CuO | — | — | — | — | 10 | — | — | — | — | 10 | — |
| PbO | — | — | — | — | — | — | — | 10 | — | — | — |
| $MoO_3$ | 40 | 30 | 20 | 35 | 30 | 60 | 60 | 60 | 20 | 30 | — |
| $WO_3$ | — | — | — | — | — | — | — | — | 20 | 10 | 50 |
| $Sb_2O_3$ | 20 | 30 | 40 | 35 | 30 | 10 | 20 | 10 | 20 | 10 | 10 |
| $P_2O_5$ | 20 | 20 | 20 | 20 | 20 | 10 | 20 | 20 | 20 | 20 | 20 |
| Tg (° C.) | 319 | 310 | 305 | 323 | — | 290 | 336 | 368 | 352 | 350 | 427 |
| α(ppm/° C.) | 15.9 | 15.8 | 16.7 | — | — | — | 13.3 | — | 13.7 | 13.2 | — |
| Wt % Δ ($H_2O$) | 0.11 | 0.17 | 0.15 | 0.11 | 0.04 | 0.44 | 0.16 | 0.22 | 0.12 | 0.06 | 0.09 |
| Wt % Δ (0.001N HCl) | — | 0.00 | 0.00 | 0.00 | 0.00 | 0.38 | 0.02 | 0.31 | 0.2 | 0.15 | — |

The Sb-stabilized Mo+W phosphate glass compositions of the present invention can serve as sealing frits, refractory adhesives, and overcladding for glass fibers and the like for the purpose of enhancing the strength of the fiber, because of their low $T_g$ and high thermal expansion coefficient.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents. Accordingly, modifications are contemplated which can be made without departing from the spirit of the described invention.

What is claimed is:

1. A glass composition comprising, expressed in terms of mole percent on the oxide basis:
   0–40% $R_2O$, where R includes Li, Na, K, Rb, Cs, Ag and Tl;
   0–20% XO, where X includes Mg, Ca, Sr, Ba, Cu, Zn, Cd and Pb;
   15–80% $MoO_3+WO_3$;
   5–60% $Sb_2O_3$;
   10–40% $P_2O_5$, and
   a total of 0–5%, in mole percent (mol %) on the oxide basis, of an oxide selected from the group consisting of $B_2O_3$, $Al_2O_3$, $SiO_2$, $TeO_2$, $Ga_2O_3$, GeO2, transition metal and rare earth metal oxides, or mixtures thereof.

2. A sealing frit prepared from a glass composition comprising, expressed in terms of mole percent on the oxide basis:
   0–40% $R_2O$, where R includes Li, Na, K, Rb, Cs, Ag and Tl;
   0–20% XO, where X includes Mg, Ca, Sr, Ba, Cu, Zn, Cd and Pb;
   15–80% $MoO_3+WO_3$;
   0.5–60% $Sb_2O_3$; and
   10–40% $P_2O_5$.

3. The sealing frit according to claim 2, the glass composition from which the sealing frit is prepared, further comprising a total of 0–5%, in mole percent (mol %) on the oxide basis, of an oxide selected from the group consisting of $B_2)_3$, $Al_2O_3$, $SiO_2$, $TeO_2$, Ga2O3, $GeO_2$, transition metal and rare earth metal oxides, or mixtures thereof.

4. The sealing frit according to claim 2, the glass composition from which the sealing frit is prepared, comprising 5–40% $Sb_2O_3$.

5. The sealing frit according to claim 2, the glass composition from which the sealing frit is prepared, comprising 10–35% $Sb_2O_3$.

6. The sealing frit according to claim 2, the glass composition from which the sealing frit is prepared, exhibiting a glass transition temperature ($T_g$) from about 250° to about 450° C.

7. The sealing frit according to claim 2, the glass composition from which the sealing frit is prepared, exhibiting a total weight loss percent after exposure to 0.001N HCl for one hour from about 0% to 0.5%.

8. The sealing frit according to claim 2, the glass composition from which the sealing frit is prepared, exhibiting a total weight loss percent after exposure to boiling distilled water for one hour from about 0% to 0.5%.

* * * * *

UNITED STATES PATENT AND TRADEMARK OFFICE
CERTIFICATE OF CORRECTION

PATENT NO.     : 6,432,851 B1                                          Page 1 of 1
DATED          : August 13, 2002
INVENTOR(S)    : Bruce Aitken It is certified that error appears in the above-identified patent and that said Letters Patent is hereby corrected as shown below:

<u>Column 4,</u>
Line 2, "5-60%" should be -- 0.5-60% --
Line 22, "$B_2)_3$" should be -- $B_2O_3$ --

Signed and Sealed this

Fourth Day of February, 2003

JAMES E. ROGAN
*Director of the United States Patent and Trademark Office*